Patented Nov. 7, 1933

1,933,828

UNITED STATES PATENT OFFICE 1,933,828

PREPARATION OF CELLULOSE NITRO-ACETATE HIGHER FATTY ACID ESTER

Cyril J. Staud, Rochester, N. Y., and Charles E. Waring, Dayton, Ohio, assignors to Eastman Kodak Company, Rochester, N. Y., a corporation of New York No Drawing. Application December 31, 1930
Serial No. 505,959

11 Claims. (Cl. 260—101)

This invention relates to the process of acylating, with a higher fatty acid of more than 7 carbon atoms partially acetylated cellulose in the presence of an acylating agent and subsequently nitrating with fuming nitric acid in the same step, and also relates to the product resulting therefrom.

It has been previously known to treat cellulose acetate with a higher fatty acid anhydride in the presence of an impelling agent. It has also been attempted to produce mixed low and high fatty esters of cellulose by treating partially acetylated cellulose with the chloride of the higher fatty acid in the presence of pyridine, the nitro esters have also been treated in the same manner. However, it has not been previously known to nitrate and acylate in the same step, partially acetylated cellulose to form a multi-acylated nitrated cellulose.

Our invention has for its object the production of triple esters of cellulose containing a nitrate, an acetate and a higher fatty acid radical. This compound combines all the advantages of the individual radicals such as flexibility, reduced inflammability and transparency with the disadvantages, if any, of each group combined with the cellulose, either reduced to a minimum or completely obliterated.

The following are given as illustrative of the carrying out of our process in the preparation of cellulose nitro-acetate stearate:

Example I

About 20 grams of stearic acid are dissolved in about 25 grams of chloracetic anhydride. Approximately 10 grams of cellulose acetate containing 30–35% acetyl are added when the above mixture is at a temperature of 80–100° C. and is maintained at this temperature until a dope has been formed, the time usually being about one-half hour. A little fuming nitric acid (about 3 cc.) dissolved in approximately 10 grams of chloracetic anhydride is added to the dope which causes a marked increase in viscosity. Some ethylene chloride may be introduced as a diluent and a satisfactory dope is obtained usually in 2–6 hours. The material then may be precipitated in methyl alcohol, extracted with ether and dried, if desired. The resulting product was found to contain 1½–2% nitrogen and a stearyl content of 26–30%. In this example technical chloracetic anhydride was employed, which contained small amounts of acid salts which salts have a sufficient catalytic effect on the reaction so that other catalysts need not be added.

Example II

About ten grams of cellulose acetate of the same kind as in Example I is dissolved in approximately 40 grams of technical chloracetic anhydride and 40 cc. of ethylene dichloride. About 25 grams of molten stearic acid is added with thorough mixing. About 5 cc. of fuming nitric acid was then added and the mass was heated at 80–100° C. for 2–4 hours.

The mixture was cooled to 15–30° C. and about the same amount of fuming nitric acid as was previously added was introduced. The mass may be allowed to stand and may be again heated as before for about the same period. It is possible to add all the fuming acid at once and heat in one operation, but the manner disclosed is preferred. The resultant product was a clear and brilliant dope and was found to contain about 2.5–3% nitrogen and about 12.5% stearyl. In Example II the fuming nitric acid is added soon after the addition of the stearic acid and it is to be noted that stearylation is much less than in Example I. This shows the rate of stearylation to be lower than the rate of nitration. By merely varying the time of addition of the nitric acid, the amount of stearylation may be controlled and the product desired may be produced by means of this simple expedient. It is permissible to use any of the common nitrating agents (such as nitric acid) where found suitable for the particular reaction.

Although chloracetic anhydride is preferred as the impelling agent, other substances such as methoxy-acetic anhydride and the like are also suitable. Other suitable solvents may be used instead of ethylene dichloride, this being a matter of individual preferance. It is also understood that the stearic acid is given as a representative example of the higher fatty acids containing more than 6 carbon atoms and other like acids both saturated and unsaturated, such as heptoic, oleic, palmitic, margaric, lauric, cerotic, undecylenic, erucic, myristic, ricinoleic, etc., are suitable.

From the foregoing it will be observed that our invention comprises acylation by a higher aliphatic acid and nitration by fuming nitric acid of a partially acetylated cellulose in the presence of an impelling agent for the acylation. The procedure involves the addition of the fuming nitric acid to the bath after the addition of the organic acid. The fuming nitric acid may be added in various proportions and the nitrogen content of the resulting product will depend on the proportion as well as on the time of adding of the fuming nitric acid as pointed out previously.

It will be seen from the above that a considerable variety of products may be obtained by varying the proportions and time of addition of materials. This process is thus applicable to the preparation of mixed cellulose esters of widely varying physical properties. Also by variation of the higher organic acids used, variation in chemical properties is possible. For example, propionic, crotonic, or butyric acid may be employed in the acylation steps, if desired. It is also within the contemplation of our invention to use more than one fatty acid in the reaction so that two or more higher fatty acid groups may be present in one molecule of the product.

We claim:

1. Cellulose nitro-acetate stearate.

2. Cellulose nitro-acetate to which a higher aliphatic acyl group is attached.

3. Cellulose nitro-acetate combined with acyl groups selected from the group consisting of the acetic acid series and the oleic series.

4. Cellulose nitro-acetate combined with acyl groups from an acid of more than 7 carbon atoms selected from the group consisting of the acetic acid series and the oleic acid series.

5. A process of making mixed cellulose esters which comprises acylating partially acetylated cellulose with a higher fatty acid in the presence of an impelling agent and subsequently nitrating the resulting product.

6. A process of making mixed cellulose esters which comprises acylating cellulose acetate having an acetyl content of 30–35% acetyl, with a higher fatty acid in the presence of an impelling agent and subsequently nitrating the resulting product.

7. A process of making mixed cellulose esters which comprises acylating cellulose acetate having an acetyl content of 30–35% acetyl, with an acid selected from the group consisting of the higher homologues of acetic acid and the oleic acid series, and subsequently nitrating the resulting product.

8. A process of making mixed cellulose esters which comprises partial acylation of cellulose acetate with an acid selected from the group consisting of propionic, stearic, oleic, palmitic, crotonic, margaric and butyric acid in the presence of an impelling agent and subsequently nitrating the resulting product.

9. A process of making mixed esters of cellulose which comprises acylating a partly acetylated cellulose acetate with a fatty acid of more than six carbon atoms per molecule in the presence of an impelling agent and subsequently nitrating the resulting product.

10. A process of making cellulose nitro-acetate-stearate which comprises acylating partially acetylated cellulose, in the presence of chloracetic anhydride, with stearic acid, and subsequently nitrating the resulting product.

11. A process of making mixed esters of cellulose which comprises acylating cellulose acetate, having an acetyl content of 30–35% acetyl, with a mixture of different fatty acids in the presence of an impelling agent and subsequently nitrating the resulting product.

CYRIL J. STAUD.
CHARLES E. WARING.